July 4, 1933.　　　W. H. MANNING　　　1,916,520
VALVE GUIDE
Filed March 30, 1931　　　2 Sheets-Sheet 1

Inventor
William H. Manning.
By Blackmore, Spencer & Flint
Attorneys

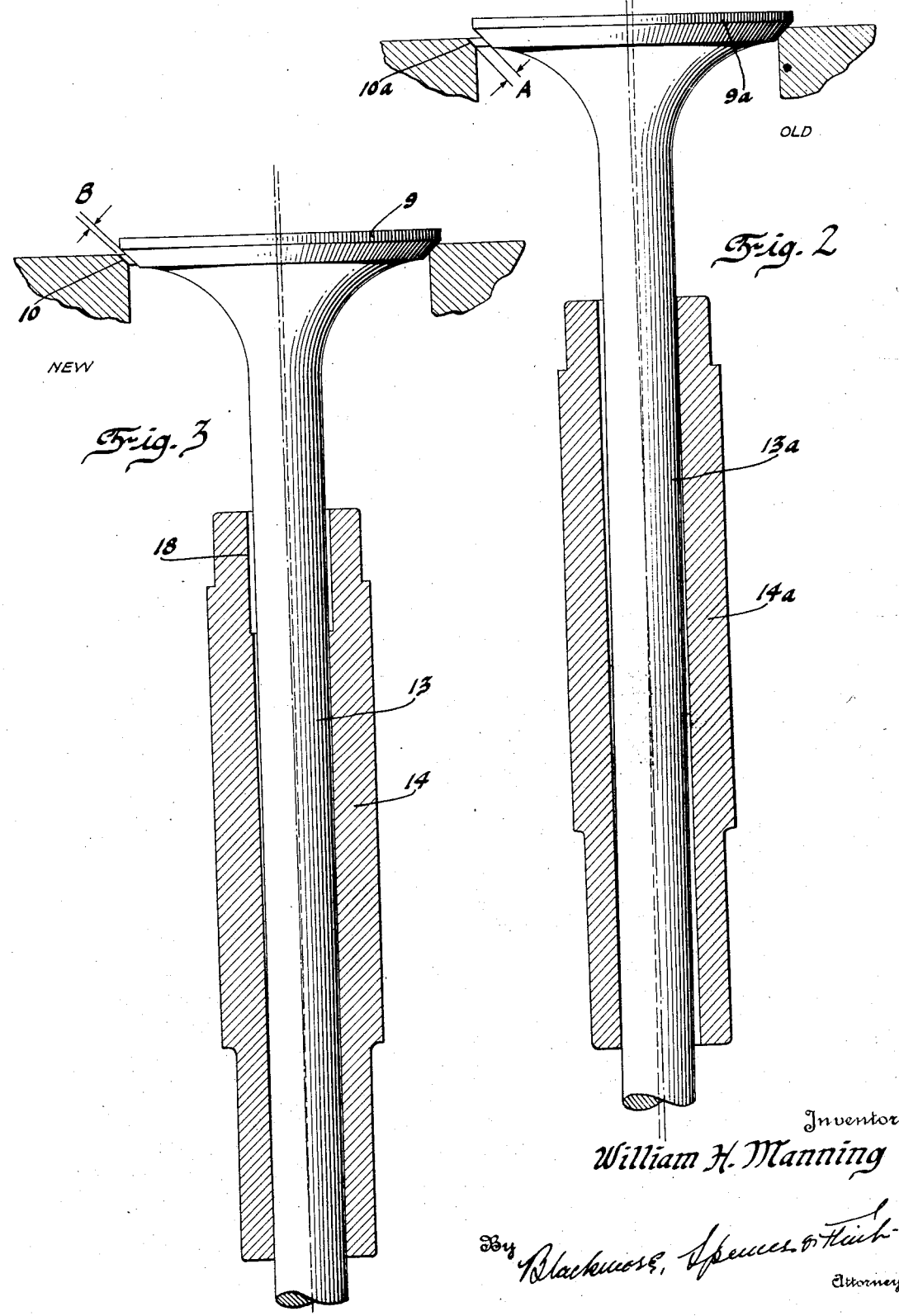

Patented July 4, 1933

1,916,520

UNITED STATES PATENT OFFICE

WILLIAM H. MANNING, OF PONTIAC, MICHIGAN, ASSIGNOR TO GENERAL MOTORS CORPORATION, OF DETROIT, MICHIGAN, A CORPORATION OF DELAWARE

VALVE GUIDE

Application filed March 30, 1931. Serial No. 526,373.

This invention relates to internal combustion engines and particularly to the engine valve assembly. More specifically, it involves sliding bearing surfaces between a poppet valve stem and the valve stem guide. Its primary object is to provide an improved bearing which, among other things, will insure better seating of the valve, reduce wear and pounding of the seats, result in quieter operation and longer life, and, incidentally, minimize gumming of the bearing surfaces by the carbonization of lubricating oil and thereby cut down the likelihood of valve sticking. These advantages and others, which will become apparent during the course of the following detailed description, are obtained by the simple expedient of providing a varying clearance between the bearing surfaces, as distinguished from the conventional practice of using a uniform bearing clearance throughout the length of the contacting parts.

To illustrate the invention,

Figure 1 of the accompanying drawings shows, in vertical section, a fragment of an engine embodying the improvement;

Figure 2 is a detail view of a valve and guide arranged in accordance with practice theretofore followed;

Figure 3 is a view similar to Figure 2 but illustrating, on a larger scale, the valve structure of Figure 1.

Figures 1, 4:
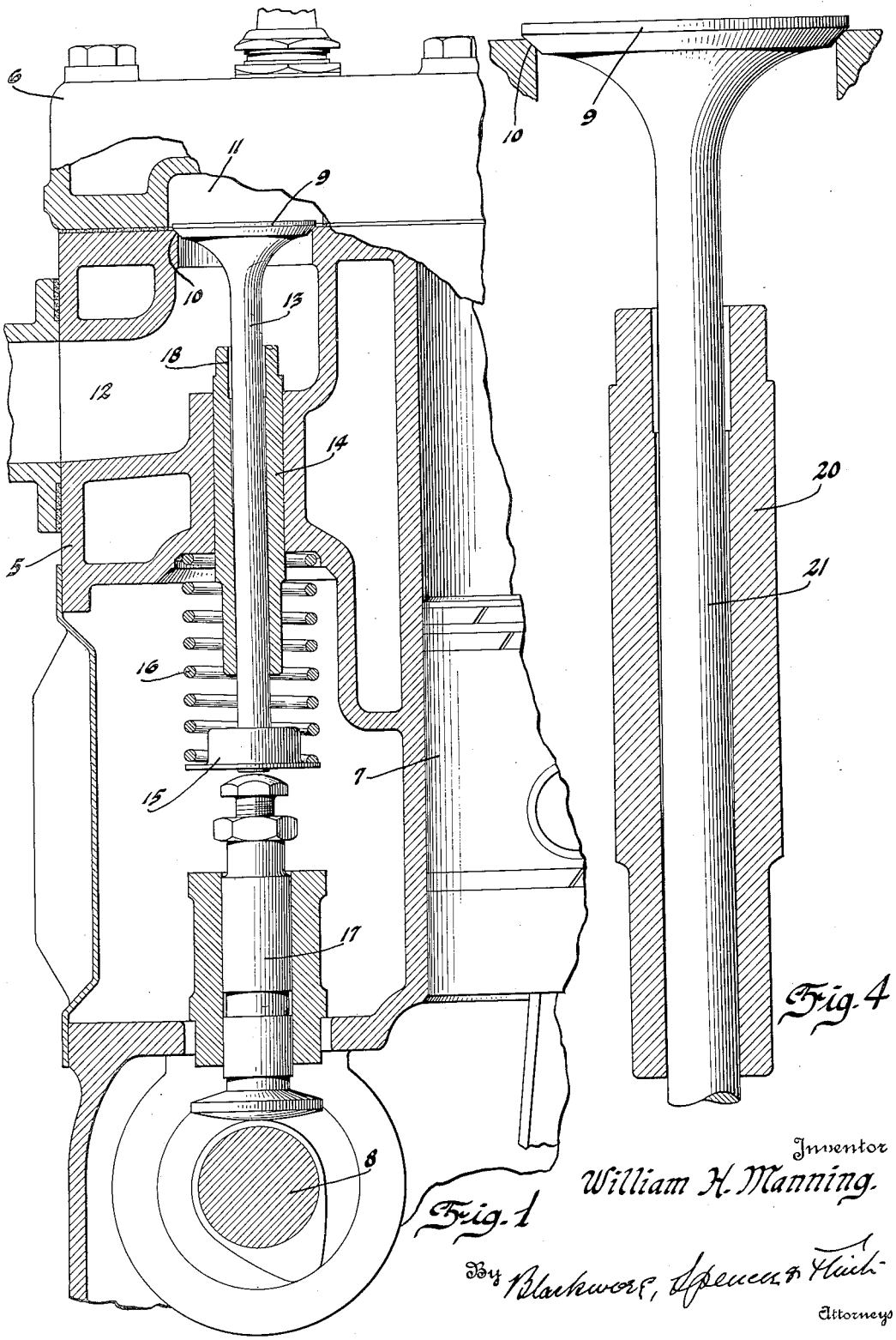
Figure 4 illustrates an alternative form of the invention.

Referring first to Figure 1, the numeral 5 indicates an engine cylinder block having removably secured thereon a head 6 and reciprocable therein a piston 7 for connection in the usual fashion with the engine crankshaft. Driven from the crankshaft, and in timed relation therewith, is a camshaft 8 for operating, in predetermined sequence, a set of valves, one of which is indicated at 9 and may be here considered as being for the control of either the intake or the exhaust. This valve is shown as resting on its seat 10, closing communication between the combustion chamber 11 in the head 6 and the port or passageway 12 in the block 5. Its stem 13 extends through the bore or opening of a guide sleeve or bushing 14 mounted in the wall of the passageway 12 and carries at its outer end a washer or retainer 15 for the customary valve spring 16 against the force of which the valve is moved to open position when the tappet 17, engaging the outer end of the stem, is lifted in the rotation of the camshaft.

For a thorough understanding of the invention, reference is made to the fact that in the ordinary construction the valve stem is of uniform diameter throughout substantially its entire length and from a point immediately adjacent the valve head to the outer end of the stem, and that the bore of the bearing bushing is similarly of a uniform size from end to end. Because of the expansion of the parts with heat, the fit between the bearing surfaces is made more or less sloppy when cold so that the parts will not bind as they take up heat and grow in size. As a result of the loose fit a certain amount of slap occurs upon the operation of the parts until they become heated up. Such slap not only results in disagreeable sounds and noises but it also causes an undue amount of wear. These faults will become obvious from an inspection of Figure 2 which shows the conventional structure with the valve stem 13a cocked in the bore of its guide 14a and bearing in substantially point contact at opposite sides with opposite ends of the guide, and the head 9a of the valve tilted and engaging at only a single point with its seat 10a. The center line of the valve stem is indicated by the dotted line, while the center line of the valve seat and guide bore is indicated by the dot and dash line. This is the position the parts are found to assume as the valve moves toward closed position and just before final and complete seating of the valve. To complete the seating under force of the valve spring, the valve must first center itself, which centering action causes the valve to fulcrum about its single point of contact with the valve seat to take up the remaining clearance existing. This clearance at a point diametrically opposite the single point of contact, is indicated by the letter A. As the valve stem swings in the bore of the guide either to or from centered position there will be a tendency for the sliding bearing surfaces to slap against each other. In some cases the valve head may even flutter slightly on its seat and at any rate the tilting of the valve head in taking up the clearance bangs the seats one on the other. Because of the loose fit of the stem in its guide, a considerable amount of lubricating oil works up on the sliding surfaces and particularly in the case of an exhaust valve the intense heat at the upper end of the guide decomposes or burns the oil leaving a gummy residue which in time retards sliding movement and even binds or holds the valve against movement.

It is a fact that while the valve head and the inner end of the stem become highly heated the lower portion of the stem remains comparatively cool. Therefore, the expansion occurs principally at the inner end of the valve and the outer end remains substantially constant size. This is particularly true of the exhaust valve since the hot gases and flame come into direct contact with the innermost portions of these parts, whereas in the case of the intake valve the incoming gases keep the parts much cooler. However, the same conditions are present in both cases but are more pronounced in the one instance.

Because of this set of circumstances I have found that the objections noted can be largely overcome by providing sufficient clearance at the innermost portion of the bearing surfaces to compensate for the expansion and cut down on the clearance toward the outermost end where expansion is negligible. For this purpose I prefer to employ a tapered bore in the valve guide 14, as is best illustrated in Figure 3 of the drawings. In this case ample clearance is afforded by a more or less loose fit at the end of the bushing while a close or even snug fit is provided at the outer end. With this arrangement the valve stem 13 is maintained at all times in approximately centered position. When the engine is first started and the parts are cold the extreme off center position to which the valve may be moved is shown by the dotted line in Figure 3, representing the center line of the valve stem as compared to the dot and dash line indicating the center line of the valve seat and guide. With the initial contact of valve head and seat, the clearance to be taken up by tilting of the valve to centered position is indicated by the letter B which will be found to be less than half of the clearance indicated at A in Figure 2, and occurring in the corresponding position of the parts arranged according to past practice. Obviously, therefore, with the extent of centering movement cut down, the tendency toward occurrence and the harmful effects of slap are appreciably reduced. The bearing surfaces between the valve stem and guide will wear a longer time and the valve seats will remain in better condition and require less frequent grinding or reseating because of the improved centering of the valve. Furthermore, greater silence of operation is obtained and the formation of an oil residue is practically eliminated since the close fit between the valve stem and lower end of the guide allows an upward movement of only enough oil to properly lubricate the bearing surfaces, and, in addition, prevents the passage of excessive quantities of hot gases thru the bore.

Certain advantages are also obtained in the manufacturing process by reason of the tapered bore since wearing away of the tapered reaming tool will not require it to be discarded as in the case of a tool of uniform diameter, since the tool simply can be moved farther into the bore to afford the tapered opening of the required size. Furthermore, the same reamer can be used to provide any desired size of hole. It may be stated, incidentally, that a taper of .001" per inch of length has been found to give the desired results in the case of a guide of approximately 3" long and a bore of approximately $\frac{5}{16}$" diameter at the small end as used on engines in the current model Pontiac automobile.

In the case of an exhaust valve it may be found helpful to provide an upwardly extending skirt at the inner end of the bushing which is out of contact at all times with the sliding stem. This skirt may be formed, as shown in the drawings, by counter-boring the inner end of the guide as at 18 to provide additional clearance around the stem. This extension surrounding the stem will serve, in a measure, to protect that portion of the stem which slides on the bearing surface of the guide, from the direct action of hot exhaust gases and, therefore, reduce the degree of expansion. The heat which is conducted through the stem toward the lower end will be transferred quickly to the guide and engine cooling jacket because of the close fit between these relatively movable parts.

In lieu of providing a tapered bore in the valve guide it will be obvious that substantially the same results may be obtained by reversing the arrangement, and providing a tapered valve stem as shown in Figure 4. Here the bore of the guide 20 is of uniform diameter from one end to the other, while the valve stem 21 has a cross sectional area which gradually decreases in size from a point adjacent the lower end of the guide inwardly and toward the valve head, affording gradual variation in clearance between the bearing surfaces with greatest clearance between the surfaces closest the valve seat.

It will be understood that such modifications as come within the scope of appended claims may be readily made without departing from the invention described specifically herein.

I claim:

1. A valve assembly wherein a reciprocatory valve element is movable into and out of engagement with a seat and is guided in its movement by the slidable engagement of a part thereof with a bearing element, characterized by bearing surfaces on the valve and bearing respectively, which differ in taper relative to each other to provide a gradual change in clearance therebetween.

2. A valve assembly wherein a reciprocatory valve element is movable into and out of engagement with a seat and is guided in its movement by the slidable engagement of a part thereof with a bearing element, characterized by bearing surfaces on the valve and bearing respectively, having a clearance therebetween that decreases away from the valve seat.

3. A valve assembly wherein a reciprocatory valve element is movable into and out of engagement with a seat and is guided in its movement by the slidable engagement of a part thereof with a bearing element, characterized by bearing surfaces on the valve and bearing respectively, having clearance therebetween which is greater in one portion than in another.

4. In an internal combustion engine having a poppet valve, a guide element having a taper bore portion slidably receiving the valve stem and providing a bearing therefor and a counterbore portion surrounding the stem in non-bearing relation.

5. The combination of a poppet valve for controlling an engine exhaust port, a guide sleeve having a tapered bore to receive the valve stem arranged to provide a valve stem bearing surface having the greatest clearance at the end thereof closest the exhaust port.

6. The combination of a pair of relatively movable members bearing one on the other, one of which is subject to greater heat at one portion than at another, and means to compensate for the unequal expansion of the bearing surfaces under heat including bearing clearance between the surfaces tapering in size from adjacent the portion which receives the most heat.

7. In an internal combustion engine, a poppet valve having a head adapted for movement into and out of engagement with a seat and a stem, a guide to slidably receive the stem, and bearing surfaces on the stem and guide tapered relative to each other.

8. In an internal combustion engine, a poppet valve having a head adapted for movement into and out of engagement with a seat, a stem, a guide to slidably receive the stem, and bearing surfaces on the stem and guide snugly fitted at the cooler running portions thereof and loosely fitted at the hotter running portions to accommodate relative expansion without binding.

9. In an internal combustion engine having a poppet valve, a guide bushing slidably receiving the valve stem and having a tapered bearing surface for the stem provided by a bore of gradually decreasing size from the end closest the valve head.

10. In an internal combustion engine having a poppet valve, a guide element having a tapered bore slidably receiving the valve stem and affording a bearing surface out of parallel with the bearing surface of the valve stem.

11. A poppet valve and guide bearing assembly in which the cross sectional area of the valve stem slidable in the bearing increases in size from a point adjacent the headed end towards the tappet end thereof to provide a tapered bearing surface.

12. A poppet valve and guide bearing assembly including a valve stem having a bearing portion wherein the cross sectional area decreases in dimension toward the valve head.

13. In an engine, a valve stem and a guide therefor, the stem and guide having bearing surfaces adapted for sliding engagement with each other, with one of said surfaces tapering in size from end to end and having a closer initial fit to the other surface at the end remote from the valve head end of the stem.

In testimony whereof I affix my signature.

WM. H. MANNING.